United States Patent
Aoki

[11] 3,895,747
[45] July 22, 1975

[54] RESIN FLOW CONTROLLING DEVICE FOR INJECTION MOLDING MACHINE

[75] Inventor: Katashi Aoki, Sakaki, Japan

[73] Assignee: Nissei Plastics Industrial Co., Ltd., Sakaki, Japan

[22] Filed: Oct. 4, 1973

[21] Appl. No.: 403,357

[30] Foreign Application Priority Data
Oct. 6, 1972  Japan.............................. 47-100379

[52] U.S. Cl. ................. 222/494; 137/525; 222/497; 425/245 NS
[51] Int. Cl.² ........................................... B29F 1/06
[58] Field of Search ........... 222/495, 494, 496, 497; 425/146, 245 NS, DIG. 224, DIG. 225, DIG. 229, 247; 137/525

[56] References Cited
UNITED STATES PATENTS

| | | | |
|---|---|---|---|
| 1,637,821 | 8/1927 | Heideman........................... | 137/525 |
| 2,345,917 | 4/1944 | Coffman ............................. | 425/146 |
| 3,023,458 | 3/1962 | Seymour......................... | 425/247 X |
| 3,024,498 | 3/1962 | Bronnenkant et al. .... | 425/DIG. 229 |

FOREIGN PATENTS OR APPLICATIONS

| | | | |
|---|---|---|---|
| 874,126 | 7/1942 | France............................... | 137/525 |
| 776,474 | 1/1935 | France............................... | 137/525 |
| 797,053 | 10/1968 | Canada.............................. | 137/525 |

Primary Examiner—Robert B. Reeves
Assistant Examiner—David A. Scherbel
Attorney, Agent, or Firm—David H. Semmes

[57] ABSTRACT

A resin flow controlling device for an injection molding machine which is simple in structure and effective in operation without a large pressure loss, retention and leakage of molten resin, and comprises an orifice formed near the outlet of a molten resin passage; a gap formed between said outlet and said orifice; and a valve plate positioned in said gap; in which said valve plate being made of a spring plate and comprising a bent or folded portion and openings for resin passage, and said closing portion contacting said orifice and being deformed by the pressure of the molten resin to open said orifice.

6 Claims, 9 Drawing Figures

RESIN FLOW CONTROLLING DEVICE FOR INJECTION MOLDING MACHINE

This invention relates to a resin flow controlling device for an injection molding machine. More particularly, the invention relates to a resin flow controlling device for resin passages, which prevents the molten resin from leakage at the nozzle of an injection device or at the gate of an injection mold.

In the conventional art, the nozzle or gate of an injection molding machine is sometimes provided with a valve in order to prevent the molten resin from leakage at the nozzle or from counter flow out of the cavity of the injection mold during the period between the completion of an injection step and the start of the next injection step. For this purpose, several valves such as a slide valve, needle valve, ball check valve and other mechanical valves are mounted in the resin passages.

In the injection nozzle, however, which is provided with a spring-operated valve, the structure of the nozzle is complicated so that the head loss of the resin flow in the nozzle becomes large, and the amount of retention of the resin is large. In addition to that, the spring is liable to be weakened with the lapse of time as the spring is exposed to the high temperature and large load.

In consideration to the above, the present invention proposes a novel resin flow controlling device which is simple in structure and is able to prevent the leakage of resin and the counter flow. Further, the device of the invention can be fitted to the gate of a cavity having hot runners as well as to the nozzle.

Pursuant to the above features, the resin flow controlling device of the present invention is provided with an orifice near the outlet of the molten resin passage to the mold cavity in like manner as that of a ball check valve, and this orifice is opened and closed by an elastic valve plate.

Said valve plate of the invention is made of a spring plate and is bent or folded to form a closing portion and openings for the passage of the molten resin. Said closing portion is pressed against said orifice by the resilience of the valve plate itself. When said valve plate which is disposed in a gap between said outlet and orifice is applied with the pressure of injection molten resin, the valve plate which closing the orifice is caused to deform, and the orifice is opened, thereby the molten resin flows to the outlet through the passage openings.

In order that the invention may be more fully understood, preferred embodiments and various supplementary features will now be described by way of example and with reference to the accompanying drawings, in which.

Referring now to the accompanying drawings, the resin flow controlling device of the present invention will be explained.

Figure 1:
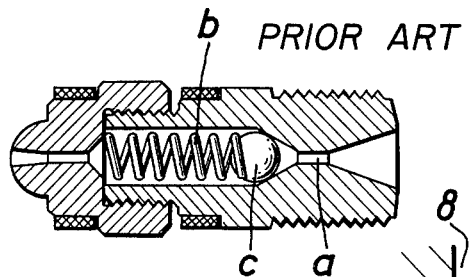
FIG. 1 is a cross-sectional view of an ordinary ball check nozzle.

FIG. 1 shows a ball check nozzle in the prior art, in which the orifice $a$ is closed by a ball $c$ which is pushed against the peripheral surface of the orifice $a$ by a coil spring $b$. When a pressure larger than a certain value is applied to the orifice $a$ from the right side of the drawing, the ball $c$ is moved to the left against the force of the spring $b$, thus the valve is opened. While, when the pressure on the left side of the drawing balances or exceeds the pressure on the right side, the valve is closed by the ball $c$, thereby the counter frow from the mold cavity to the injection cylinder can be prevented. In this structure, however, the volume of retention of the resin material is relatively large and the structure is complicated so that several disadvantages can not be avoided which will be described in the following.

In the embodiments as shown in FIGS. 2 to 7, the devices of the present invention are attached to the nozzles. The numeral 1 denotes a nozzle, 2 an outlet of molten resin passage, 3 an orifice in the molten resin passage, 5 a valve plate which is positioned in a gap 6, 7 an injection cylinder, and 8 a mold cavity.

In the embodiment as shown in FIGS. 2 to 5, the valve plate 5 is a rectangular spring plate which is bent to a small extent and provided with a conical projection 9 at the central closing portion. The above-mentioned orifice 3 is formed at the center on the top end of the injection cylinder 7. Said valve plate 5 is positioned within the gap 6 formed by the concave of the nozzle 1 so that said projection 9 of the valve plate 5 engages with said orifice 3, thus the orifice 3 can be closed and opened. Further, the valve plate 5 is somewhat bent to the direction of the orifice 3, accordingly, unless the valve plate 5 is bent back by the pressure of the molten resin within the injection cylinder, the orifice 3 is tightly closed by the projection 9 of the valve plate 5.

Figure 6:
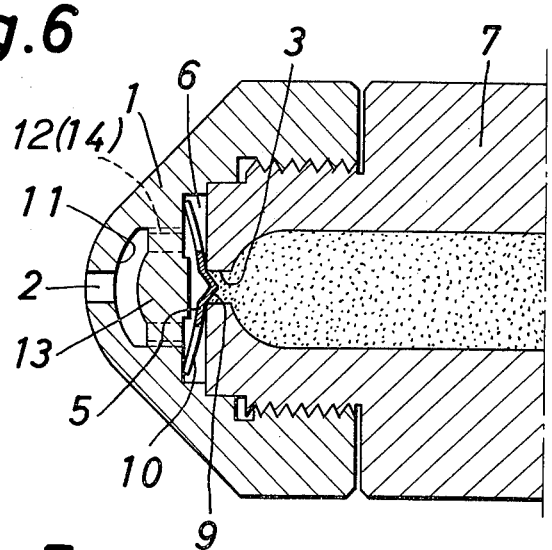
FIGS. 6 and 7 are cross-sectional views of another embodiment of the present invention.
Figure 7:
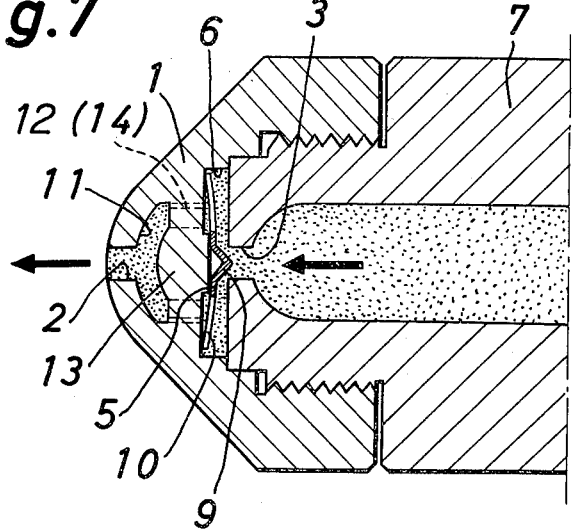
Figure 8:
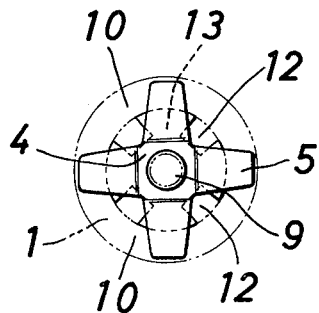
FIG. 8 is a front elevation of the valve plate of the present invention.

The embodiment as shown in FIGS. 6 and 7 is a modification of the foregoing one, in which the configuration of the valve plate 5 is changed. In this valve plate 5, the peripheral four portions around the conical projection 9 of the plate 5 are cut to form a cross as shown in FIG. 8, thereby the openings 10 for the flow of molten resin are provided. The orifice 3 is closed in like manner as the foregoing embodiment in which the tapered surface of the projection 9 is pushed to the peripheral edge of the orifice 3. Further, the inside of the nozzle 1 is provided with a well 11, and a support member 13 having a plurality of grooves 12 on the peripheral surface and the end surface is fitted within said well 11. Thereby, the resin passages 14 are formed by said grooves 12, and when the valve plate 5 is deformed by the pressure of the molten resin, said support member 13 holds the central portion of the valve plate.

In the following, the operation of the above-mentioned embodiments will be explained.

Figure 2:
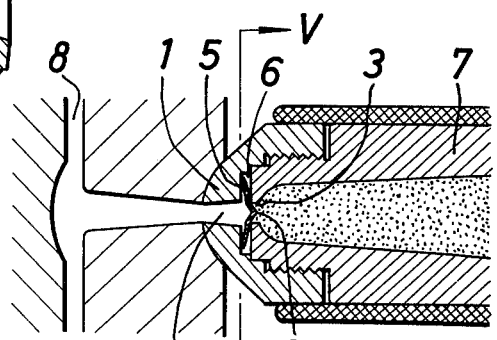
FIG. 2 is a cross-sectional view of the main part of an injection device which is provided with an injection nozzle having the resin flow controlling device of the present invention, where the molten resin is transferred to the injection cylinder while the valve plate is not pushed open.

In FIGS. 2 and 6, the molten resin is filled into the injection cylinder 7 by the rotation of a feeding screw (not shown), in this case, the inside pressure of the cylinder 7 acts on the valve plate 5, however, the pressure is not so large as to force open the valve plate 5, so that the molten resin is not caused to leak through the outlet 2.

Figure 3:
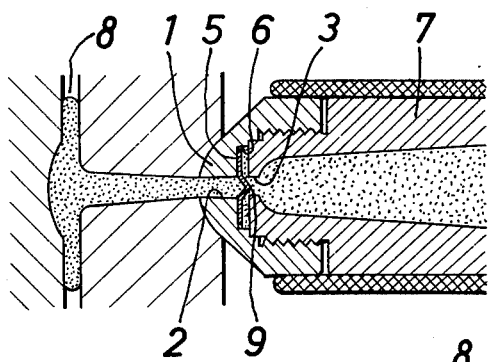
FIG. 3 is a cross-sectional view of the same part as that of FIG. 2 where the molten resin is injected.

In FIGS. 3 and 7, the states during the injections are shown. By a higher pressure of the molten resin within the cylinder 7, the valve plate 5 is deformed to be flat, and the projection 9 of the valve plate 5 is pushed back to open the orifice 3, thus the molten resin is injected into the mold cavity 8 through the opening passages 10 of the valve plate 5 and the outlet 2.

Figure 4:
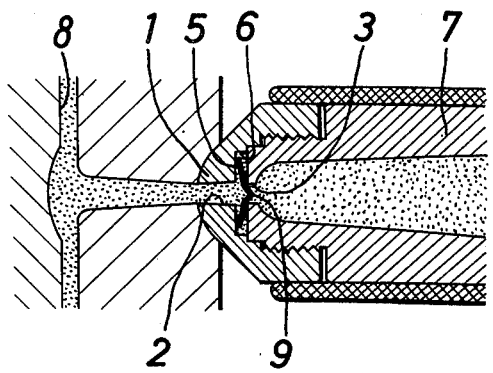
FIG. 4 is a cross-sectional view of also the same part as that of FIG. 2 where the mold cavity is completely filled with the molten resin and the pressure in the cavity balances with the pressure in the injection cylinder.
Figure 5:
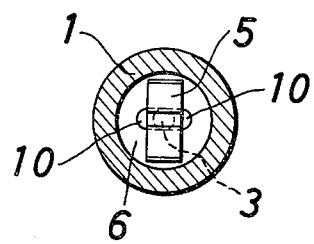
FIG. 5 is a cross-sectional view of the device of the present invention which is taken along the line V—V in FIG. 2.

In FIG. 4, the condition in which the mold cavity 8 is completely filled with the molten resin is shown. In this state, the pressures on the molten resins before and behind the valve plate 5 become equal with each other, thereby the valve plate 5 recovers the original condition by its own resiliency, accordingly, the orifice 3 is closed again.

As compared with the aforementioned ball check valve in the prior art, the above resin flow controlling devices of the present invention have the following advantages.

a. In the device of the present invention, the retention volume of the molten resin is small, while in the ball check valve, relatively large amount of resin is retained in the front portion of the valve seat.

b. The resin is not caused to decompose in the present device, while the resin in the prior ball check valve is liable to decompose as a larger amount is retained.

c. The change of resin material is easy in the present device, while it is not so easy in the ball check valve.

d. The stringiness of the molded article is not caused by the present device, while it is liable to occur by the ball check valve.

e. The leakage of the resin from the nozzle portion can be completely prevented in the present device, while it is caused to occur in the ball check valve by the thermal expansion of the retained resin.

Figure 9:
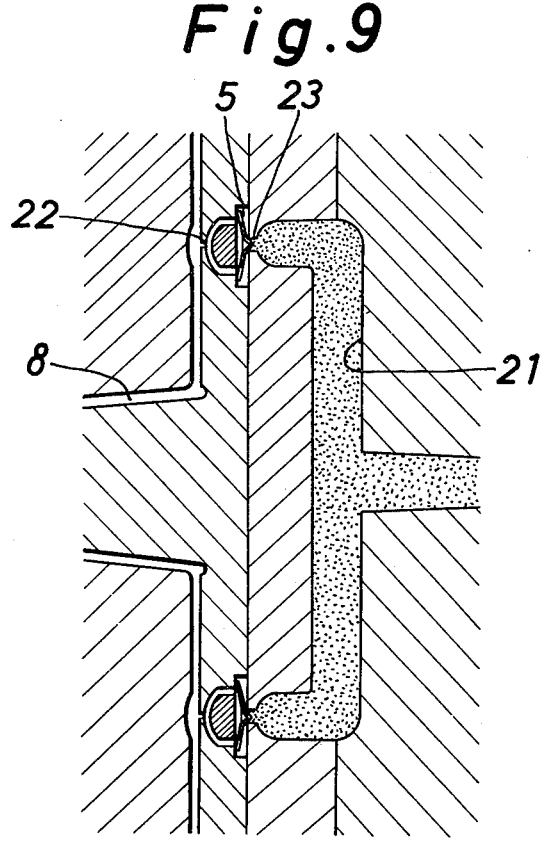
FIG. 9 is a cross-sectional view of the main part of the mold cavity which is provided with the controlling devices of still other embodiment of the present invention.

In the embodiment as shown in FIG. 9, the outlets of molten resin passage in the mold assembly, that is, the portions of hot runners 21 near to gates 22 are provided with orifices 23. A resin flow controlling device which is similar to that as shown in FIG. 6 is attached between each gate 22 and orifice 23, in which the action and effects of the valve plate 5 are the same as those of the foregoing embodiments.

As will be understood from the above description, the resin flow controlling device of the present invention having the aforementioned structure gives several effects which are different from those of the valve in the prior art. The effects of the invention will be described in the following.

1. The structure being simple, the amount of retention of the molten resin is small, accordingly, the decomposition of the resin is not caused and the change of the resin material can be easily carried out. In addition, the valve plate is positioned in the relatively low temperature portion near the top end of the nozzle, so that the molten resin is hardly subject to the influence of heat.

2. When the valve plate is once opened, the pressure of the resin is applied to the whole surface of the valve plate, so that the valve is not closed even when the pressure is lowered a little. Therefore, the head loss during the injection is very small.

3. When the injection is completed, the valve plate returns to the original position to close the resin passage. Thus, the counter flow of the resin from the mold cavity can be prevented (check valve effect), therefore the sink mark is not formed on the molded article. By this effect, the step of maintaining the injection pressure for preventing the formation of sink mark is not necessary, so that the injection cycle time can be reduced.

4. The valve plate is positioned near to the top end of the nozzle, therefore, the retained resin in the nozzle portion is less and the "stringiness" can be prevented.

5. When the device is attached to the mold having hot runners, the leakage of the resin into the mold cavity before the injection step by the residual pressure and thermal expansion of the resin in the hot runners can be prevented.

6. When foamable resin is injected, the counter flow of the foamed resin form the cavity to the nozzle can be prevented.

Lastly, it should be emphasized that the specific embodiments described and shown herein are intended as merely illustrative and in no way restrictive of the invention.

What is claimed is:

1. A resin flow controlling device for an injection molding machine which comprises an orifice formed near the outlet of a molten resin passage; gap means formed between said outlet and said orifice; a valve plate positioned within said gap; said valve plate comprising a spring plate having a bent closing portion and defining with said gap openings for resin passage, said closing portion normally contacting said orifice and being deformable to an out of contact position by pressure of molten resin at said orifice to open said orifice, wherein said gap means further comprises a supporting member defining an opening for resin passage between said valve plate and said outlet, said supporting member adapted to maintain said closing portion of said spring plate in said out of contact position.

2. A resin flow controlling device for an injection molding machine as claimed in claim 1, in which said closing portion is formed in the middle of said valve plate, said openings for resin passage are formed on the peripheral portions of said valve plate, further said closing portion is provided with a conical projection, and the tapered surface of said conical projection is pushed to said orifice to close said orifice with such pressure that, when the pressure of molten resin being applied in the injection step, said conical projection is separated from said orifice to open said orifice.

3. A resin flow controlling device for an injection molding machine as claimed in claim 1, in which said device is attached to the top end portion of an injection cylinder.

4. A resin flow controlling device for an injection molding machine as claimed in claim 1, in which said device is attached between the gate of mold cavity and hot runner in a mold.

5. A resin flow controlling device for an injection molding machine as claimed in claim 1, in which the plan shape of said valve plate is a rectangle.

6. A resin flow controlling device for an injection molding machine as claimed in claim 1, in which the plan shape of said valve plate is a cross.

* * * * *